Mar. 13, 1923.

L. R. SMITH.

HEAT CONTROL OF MIXTURE FOR INTERNAL COMBUSTION ENGINES.

FILED MAR. 2, 1921.

1,448,008.

Patented Mar. 13, 1923.

1,448,008

UNITED STATES PATENT OFFICE.

LEON R. SMITH, OF INDIANAPOLIS, INDIANA.

HEAT CONTROL OF MIXTURE FOR INTERNAL-COMBUSTION ENGINES.

Application filed March 2, 1921. Serial No. 449,126.

*To all whom it may concern:*

Be it known that I LEON R. SMITH, a citizen of the United States, residing at Indianapolis, in the county of Marion and State of Indiana, have invented a new and useful Heat Control of Mixture for Internal-Combustion Engines, of which the following is a specification.

It has been found that certain types of internal combustion engines work substantially as well with kerosene as the fuel as with gasoline, without any change, while operating under approximately full load and speed; but that they do not operate well at low speed or under light load unless the mixture is heated.

It is the object of my invention to provide a mixture-supply system for internal combustion engines wherein the admitted air or the final mixture supplied to the engine, or both, may be either hot or cold as required; and to control this condition in response to the vacuum in the intake passage, which vacuum varies upon changes in the load.

Figure 1:
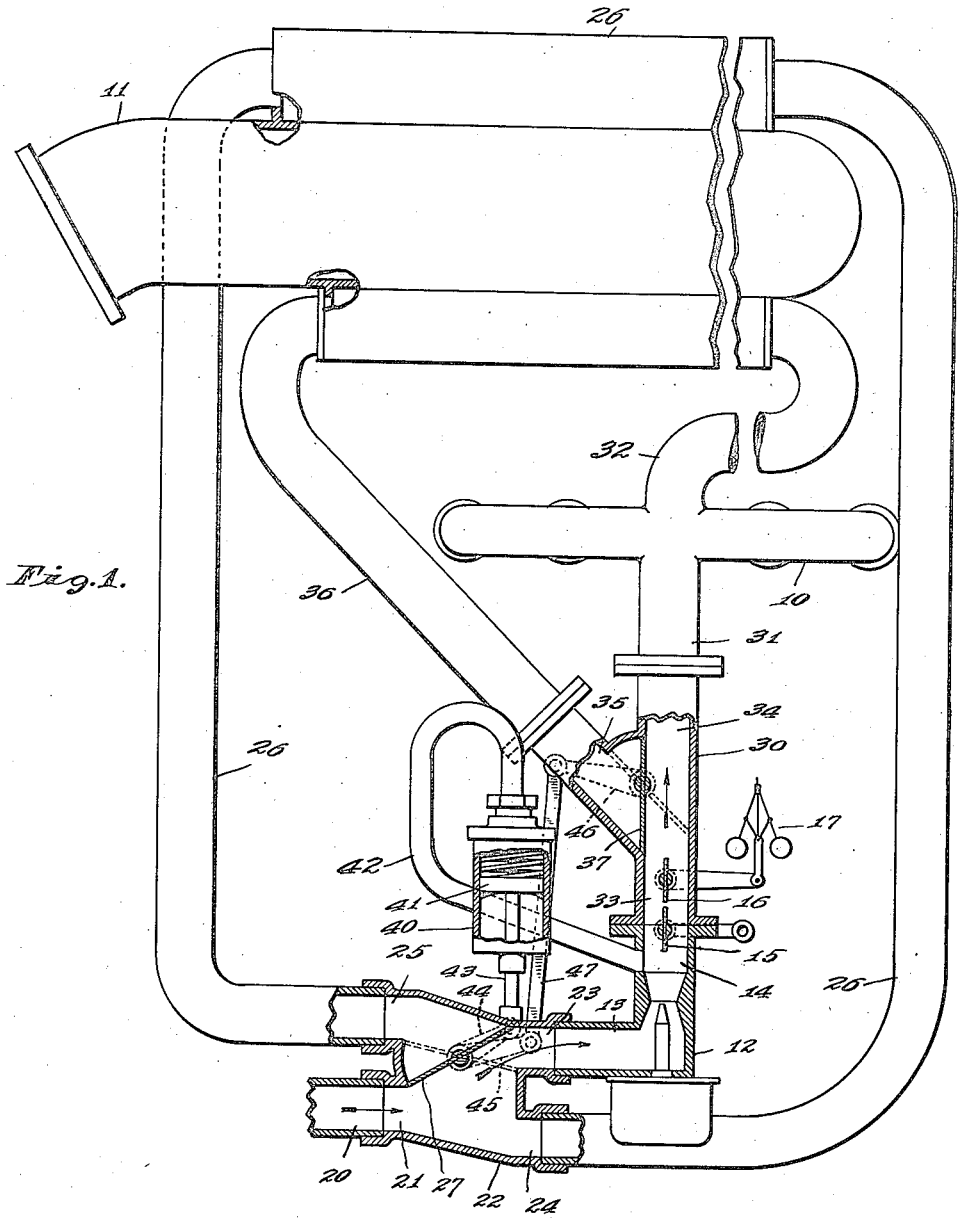
Figure 2:
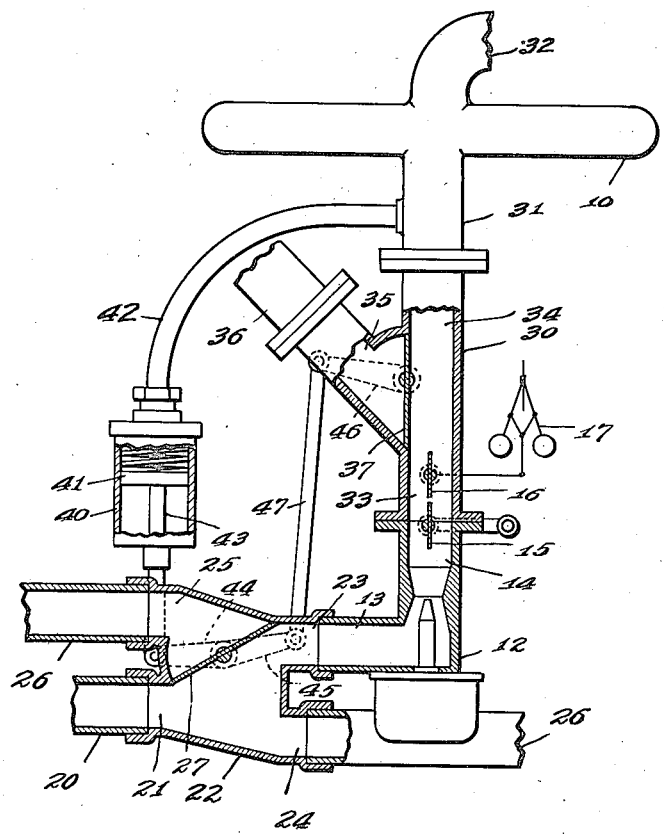

The accompanying drawing illustrates my invention. Fig. 1 is a somewhat diagrammatic view showing the necessary parts of the supply system, in their diagrammatic relations though without any attempt to show them in the actual structural relationship which they have in the actual engine; and Fig. 2 is a diagrammatic view of another way of connecting the vacuum-operated device.

The engine itself is of any desired character, usually having a number of cylinders, and this engine is provided with any suitable intake manifold 10 and any suitable exhaust manifold 11. The explosive mixture for the engine is formed by any suitable carburetor 12, having an air inlet 13 and a mixture outlet 14, with a hand throttle 15 controlling the flow through the carburetor. In addition there may be a governor-controlled throttle 16, controlled by a governor 17 responsive to the speed of the engine. These parts may all be of any desired construction.

The air is supplied by an air-inlet pipe 20, which leads into one opening 21 of a four-opening valve fitting 22. A second opening 23 of such valve fitting connects to the inlet opening 13 of the carburetor 12. The other two openings 24 and 25 of such valve fitting are to the inlet and outlet ends of a pipe 26 which passes in heat-transferring relationship to the exhaust manifold 11, as for example by including in its course a jacket on such exhaust manifold. A valve 27 in the fitting 22 controls the connections between the several openings of such fitting, when in the full-line position shown closing the opening 25 and directly connecting the openings 21 and 23 so that air from the supply pipe 20 may pass directly into the carburetor without passing through the heating pasage 26, and when in the dotted-line position shown connecting the opening 21 to the opening 24 and the opening 25 to the opening 23 and shutting off the openings 21 and 24 from the openings 25 and 23 so that the air coming in through the pipe 20 and opening 21 must pass through the heating passage 26 before it can enter the carburetor 12. Thus two paths for the air are provided, one of which lets the air into the carburetor cold and the other of which requires it to pass through the heating passage 26 before entering the carburetor.

The outlet opening of the carburetor 12 is connected to the intake manifold 10 by a similar two-passage arrangement permitting the mixture to pass to the manifold cold or requiring it to be heated before it can reach the manifold. For this purpose a valve fitting 30 is interposed between the outlet 14 of the carburetor and the lower inlet 31 of the two inlets 31 and 32 with which the intake manifold 10 is provided. The fitting 30 is provided with two openings 33 and 34 connected to the outlet 14 of the carburetor and such lower inlet 31 of the intake manifold 10; and in addition is provided with a third opening 35 which is connected to one end of a heating passage 36, the other end of which is connected to the upper opening 32 of the inlet manifold 10. This heating passage 36, like the heating passage 26, passes in heat-transferring relationship to the exhaust manifold 11, as for example by being formed as a jacket thereon. A valve 37 in the fitting 30 controls the passage through such fitting, when in the full-line position shown permitting the mixture from the carburetor to pass directly from the carburetor to the inlet opening 31 of the manifold 10 without being heated and closing the opening 35, and when in the dotted-line position shown closing the opening 34 and connecting the openings 33 and 35 so that the mixture from the carburetor is required to pass through the heating passage 36 and to enter the intake manifold by the upper inlet opening 32 thereof.

The two valves 27 and 37 are preferably similarly controlled, to include both or neither of the heating passages 26 and 36 in the passage of the air and explosive mixture to and from the carburetor. While these may be otherwise controlled, I prefer to control them jointly by a vacuum-operated device responsive to the vacuum of the intake passage, preferably below the throttles 15 and 16 though not necessarily so. Such a vacuum-operated device 40 is illustrated diagrammatically as a cylinder containing a downwardly spring-pressed piston 41, the upper end of the cylinder being connected in Fig. 1 by a pipe 42 to the carburetor below the throttles 15 and 16 but above the venturi of the carburetor, and in Fig. 2 to the intake manifold 10 above the throttles 15 and 16. The piston rod 43 of the piston 41 is connected to operate both valves 27 and 37. This connection is illustrated diagrammatically by having the piston rod 43 connected to an arm 44 on the valve 27, and by having two arms 45 and 46 on the two valves 27 and 37 interconnected by a link 47. The two valves are thus moved correspondingly from full-line to dotted-line position and vice versa, to control similarly the heating passages 26 and 36. The arm 44 projects in opposite directions in Figs. 1 and 2, because the vacuum variations are different according as the pipe 42 is connected above or below the throttles.

The operation of the arrangements shown in the two figures will be considered separately, though under many conditions they produce the same ultimate results. Referring first to Fig. 1: When the engine is operated on full load and speed, or substantially full load and speed, with the throttles 15 and 16 open, the vacuum below the throttles 15 and 16 is the maximum, so that the piston 41 is drawn up against its spring to move the valves 27 and 37 to the full-line positions shown, whereby the air from the passage 20 may pass direct to the carburetor and the mixture from the carburetor may pass direct to the intake manifold without bringing the heating passages 26 and 36 into play. This operation is satisfactory at full load and speed without any heating of the air or explosive mixture. When the load is taken off the engine, however, and the governor 17 closes the throttle 16, the vacuum below the throttles is decreased, and this allows the piston 41 to be pushed down by its spring, to move the valves 27 and 37 to the dotted-line positions shown; the same decrease of vacuum occurs if the speed drops from an excessive load. This compels the air from the intake passage 20 to pass through the heating passage 26 before it can enter the carburetor, and requires the explosive mixture from the carburetor to pass through the heating passage 36 before it can enter the intake manifold. This produces the required heating for proper operation under light-load or under low speed and excessive load conditions. When normal speed and full-load conditions are restored, and the throttle 16 is opened or the engine speeds up as the case may be, the vacuum below the throttles is raised and the valves 27 and 37 are returned to their full-line positions, eliminating the heating action.

Referring now to Fig. 2: When the engine is operating at full load and speed, with the throttle or throttles open, the vacuum above the throttles is a minimum and the piston 41 is pushed down by its spring to hold the valves 27 and 37 in full-line position and eliminate the heating action. When one or the other throttle is closed, however, the vacuum in the intake manifold above the throttles is increased and the piston 41 is drawn up against its spring to move the valves 27 and 37 to their dotted-line position and cut in the heating passages 26 and 36.

While it is desirable to have this selective-passages control on both the intake side and the discharge side of the carburetor, as illustrated, it is entirely possible in many engines and with many fuels to operate with such selective-passage control on but one side of the carburetor. While this invention was primarily intended for kerosene as the fuel, it is of course not at all limited to that fuel but can be used with any fuel when selective heating is desirable.

I claim as my invention:

1. In combination with the intake manifold of an internal combustion engine and a carburetor for supplying said intake manifold, two conduits connecting said carburetor to said intake manifold, one of said conduits including means for heating the material passing through it, a valve for selectively controlling said two conduits, a controlling throttle for the intake passage, and means controlled by the vacuum in said intake passage below such throttle for controlling said valve.

2. In combination with the intake and exhaust manifolds of an internal combustion engine and a carburetor for supplying said intake manifold, two conduits connecting said carburetor to said intake manifold, one of said conduits passing in heat-transferring relationship to the exhaust manifold of such engine, a valve for selectively controlling said two conduits, a controlling throttle for the intake passage, and means controlled by the vacuum in said intake passage below such throttle for controlling said valve.

3. In combination with the intake manifold of an internal combustion engine and a carburetor for supplying said intake manifold, two conduits connecting said carburetor to said intake manifold, one of said conduits including means for heating the material passing through it, a valve for selectively controlling said two conduits, and means controlled by the vacuum in the intake passage of the engine for controlling said valve.

4. In combination with the intake and exhaust manifolds of an internal combustion engine and a carburetor for supplying said intake manifold, two conduits connecting said carburetor to said intake manifold, one of said conduits passing in heat-transferring relationship to the exhaust manifold of such engine, a valve for selectively controlling said two conduits, and means controlled by the vacuum in the intake passage of the engine for controlling said valve.

5. In combination with the intake manifold of an internal combustion engine and a carburetor for supplying said intake manifold, a conduit provided with means for heating it, said conduit being connected to the intake of said carburetor, a valve for selectively admitting air to said carburetor either through said conduit or independently thereof, and a vacuum-responsive device connected to the intake passage of the engine and controlling said valve.

6. In combination with the intake and exhaust manifolds of an internal combustion engine and a carburetor for supplying said intake manifold, a conduit arranged in heat-transferring relationship to said exhaust manifold, said conduit being connected to the intake of said carburetor, a valve for selectively admitting air to said carburetor either through said conduit or independently thereof, and a vacuum-responsive device connected to the intake passage of the engine and controlling said valve.

7. In combination with the intake manifold of an internal combustion engine and a carburetor for supplying said intake manifold, two heating conduits connectible respectively to the air inlet of said carburetor and between the outlet of the carburetor and said intake manifold, valves for cutting said conduits into and out of service, and common means for controlling said valves.

8. In combination with the intake and exhaust manifold of an internal combustion engine and a carburetor for supplying said intake manifold, two heating conduits in heat-transferring relationship to said exhaust manifold and connectible respectively to the air inlet of said carburetor and between the outlet of the carburetor and said intake manifold, valves for cutting said conduits into and out of service, and common means for controlling said valves.

9. In combination with the intake manifold of an internal combustion engine and a carburetor for supplying said intake manifold, two heating conduits connectible respectively to the air inlet of said carburetor and between the outlet of the carburetor and said intake manifold, valves for cutting said conduits into and out of service, and means responsive to the vacuum in the intake passage of the engine for controlling said valves.

10. In combination with the intake and exhaust manifolds of an internal combustion engine and a carburetor for supplying said intake manifold, two heating conduits in heat-transferring relationship to said exhaust manifold and connectible respectively to the air inlet of said carburetor and between the outlet of the carburetor and said intake manifold, valves for cutting said conduits into and out of service, and means responsive to the vacuum in the intake passage of the engine for controlling said valves.

11. In combination with the intake manifold of an internal combustion engine and a carburetor for supplying said intake manifold, a controlling throttle, two conduits connecting said carburetor to said intake manifold, one of said conduits including means for heating the material passing through it, a valve for selectively controlling said two conduits, and means responsive to the vacuum in the intake passage of the engine below such throttle for operating said valve to cut said heating conduit into and out of service respectively as said vacuum falls and rises.

12. In combination with the intake manifold of an internal combustion engine and a carburetor for supplying said intake manifold, a controlling throttle, a conduit provided with means for heating it, said conduit being connected to the intake of said carburetor, a valve for selectively admitting air to said carburetor either through said conduit or independently thereof, and means responsive to the vacuum in the intake passage of the engine below such throttle for operating said valve to cut said heating conduit into and out of service respectively as said vacuum falls and rises.

13. In combination with the intake manifold of an internal combustion engine and a carburetor for supplying said intake manifold, a controlling throttle, two heating conduits connectible respectively to the air inlet of said carburetor and between the outlet of the carburetor and said intake manifold, valves for selectively cutting said conduits into and out of service, and means responsive to the vacuum in the intake passage of the engine below said throttle for operating said valves to cut said heating conduits into and out of service respectively as said vacuum falls and rises.

14. In combination with the intake manifold of an internal combustion engine and a carburetor for supplying said intake manifold, means for heating the material passing from the carburetor to the intake manifold, and means controlled by the vacuum in the intake passage of the engine for controlling said heating means.

15. In combination with the intake manifold of an internal combustion engine and a carburetor for supplying said intake manifold, means for heating the material passing from the carburetor to the intake manifold and for heating the air supplied to said carburetor, and means controlled by the vacuum in the intake passage of the engine for controlling said heating means.

LEON R. SMITH.